US009736356B2

(12) United States Patent
Nonaka

(10) Patent No.: US 9,736,356 B2
(45) Date of Patent: Aug. 15, 2017

(54) PHOTOGRAPHING APPARATUS, AND METHOD FOR PHOTOGRAPHING MOVING OBJECT WITH THE SAME

(71) Applicant: Olympus Corporation, Shibuya-ku, Tokyo (JP)

(72) Inventor: Osamu Nonaka, Kanagawa (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/829,772

(22) Filed: Aug. 19, 2015

(65) Prior Publication Data

US 2015/0358521 A1 Dec. 10, 2015

Related U.S. Application Data

(63) Continuation of application No. 13/957,160, filed on Aug. 1, 2013.

(30) Foreign Application Priority Data

Aug. 2, 2012 (JP) .................................. 2012-172239

(51) Int. Cl.
*H04N 5/232* (2006.01)
*G06K 9/00* (2006.01)
*G06T 7/20* (2017.01)

(52) U.S. Cl.
CPC ..... *H04N 5/23216* (2013.01); *H04N 5/23219* (2013.01); *H04N 5/23296* (2013.01);
(Continued)

(58) Field of Classification Search
None
See application file for complete search history.

(56) References Cited

U.S. PATENT DOCUMENTS 8,125,526 B2 2/2012 Maruyama et al.
8,675,098 B2 3/2014 Ohashi et al.
(Continued)

FOREIGN PATENT DOCUMENTS

CN 101014093 8/2007
CN 101071252 11/2007
(Continued)

OTHER PUBLICATIONS

Chinese Office Action to Chinese Patent Application No. 201310334476.4, mailed on Mar. 28, 2016 (9 pgs.).
(Continued)

*Primary Examiner* — Justin P Misleh
(74) *Attorney, Agent, or Firm* — John C. Pokotylo; Straub & Pokotylo

(57) ABSTRACT

A photographing apparatus includes: an image pickup section picking up an image of an object to acquire image data; a part judgment section judging a particular part of the object in the image shown based on the image data; a change-in-part judgment section judging change over time of the part of the object judged by the part judgment section; and a control section changing a photographing condition in accordance with a result of the judgment by the change-in-part judgment section, wherein the part judgment section judges a first part of the object in the image and a second part presumed from the first part; and the change-in-part judgment section judges change over time of the second part.

9 Claims, 11 Drawing Sheets

(52) U.S. Cl.
CPC ..... *G06K 9/00335* (2013.01); *G06K 9/00362* (2013.01); *G06T 7/20* (2013.01); *H04N 5/232* (2013.01); *H04N 5/23293* (2013.01)

(56) References Cited

U.S. PATENT DOCUMENTS

| | | | |
|---|---|---|---|
| 9,143,671 B2 * | 9/2015 | Nonaka | H04N 5/232 |
| 2007/0182823 A1 * | 8/2007 | Maruyama | G06K 9/00228 |
| | | | 348/207.99 |
| 2010/0226636 A1 | 9/2010 | Hirai et al. | |
| 2012/0038796 A1 * | 2/2012 | Posa | H04N 5/23216 |
| | | | 348/240.2 |

FOREIGN PATENT DOCUMENTS

| | | |
|---|---|---|
| CN | 101848337 | 9/2010 |
| CN | 102158649 | 8/2011 |
| CN | 102360423 | 2/2012 |
| JP | 2007-235924 | 9/2007 |
| JP | 2011-211438 | 10/2011 |

OTHER PUBLICATIONS

Second Office Action to corresponding Chinese Patent Application No. 201310334476.4, mailed on Aug. 23, 2016 (12 pgs.).
Office Action to corresponding Japanese Patent Application No. 2016-227743, dated Jun. 27, 2017 (3 pgs.).

* cited by examiner

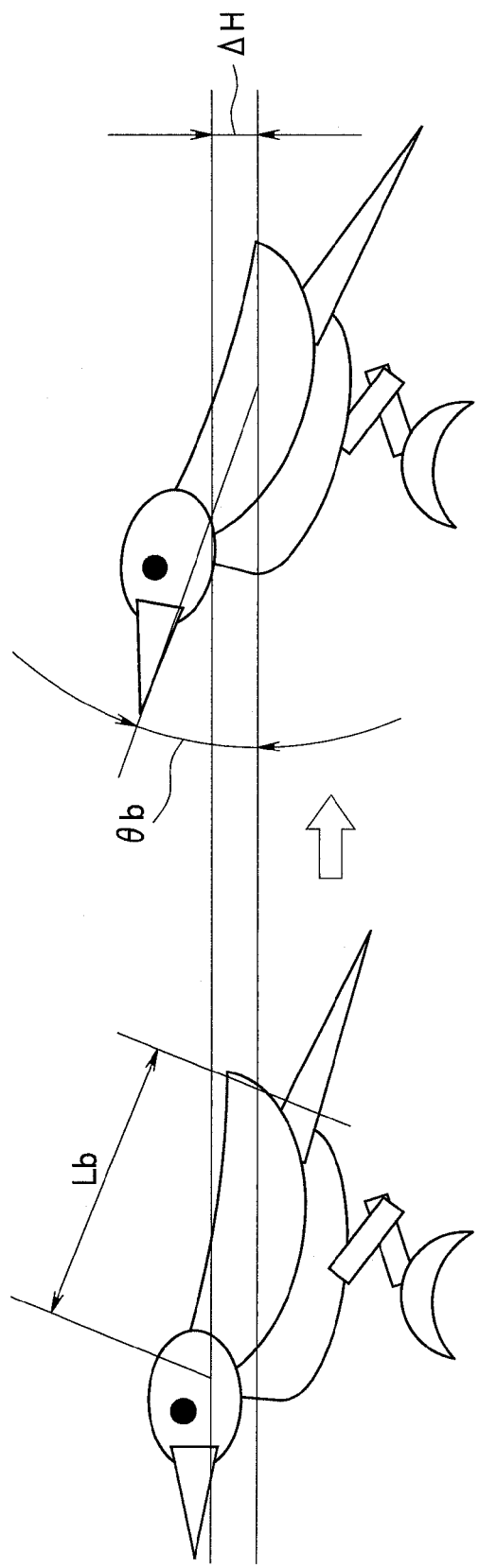

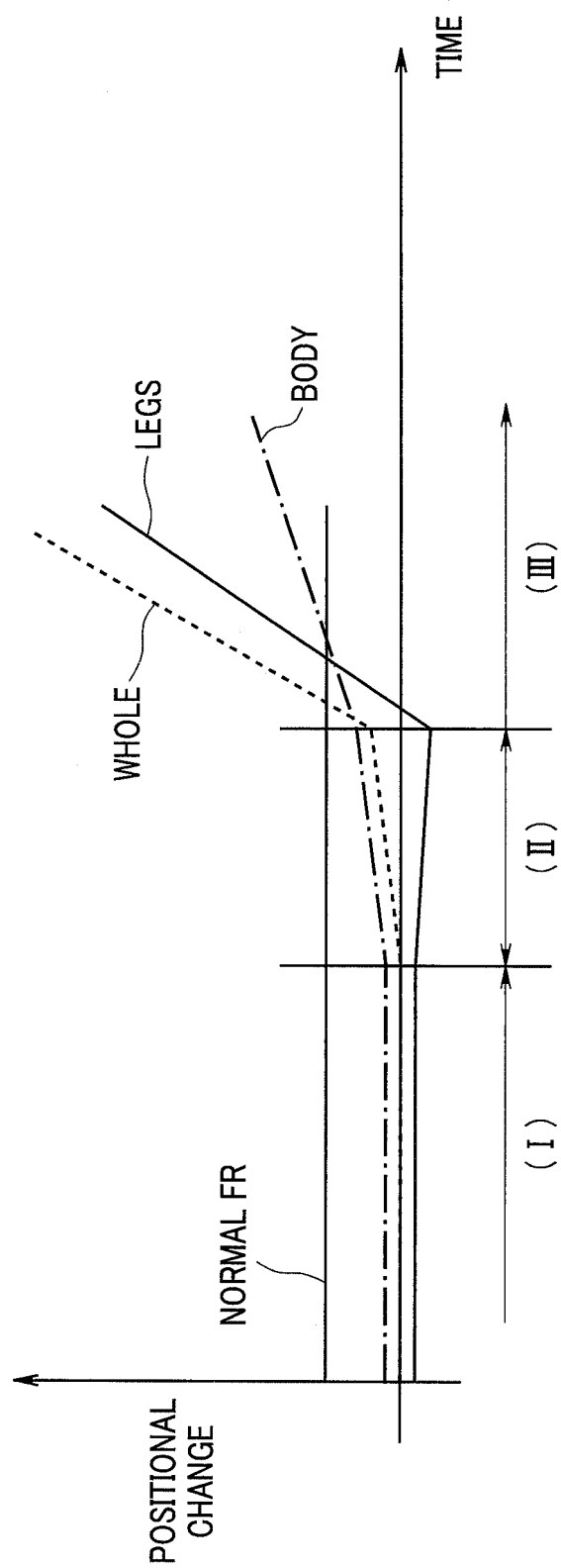

PHOTOGRAPHING APPARATUS, AND METHOD FOR PHOTOGRAPHING MOVING OBJECT WITH THE SAME

CROSS-REFERENCE TO RELATED APPLICATIONS

This application is a continuation of U.S. patent application Ser. No. 13/957,160 (referred to as "the '160 application" and incorporated herein by reference), filed on Aug. 1, 2013, titled "PHOTOGRAPHING APPARATUS, AND METHOD FOR PHOTOGRAPHING MOVING OBJECT WITH THE SAME" and listing Osamu NONAKA as the inventor, the '160 application claiming the benefit of Japanese Application No. 2012-172239 filed in Japan on Aug. 2, 2012, the contents of which are incorporated herein by this reference.

BACKGROUND OF THE INVENTION

1. Field of the Invention

The present invention relates to a photographing apparatus for photographing an object, and a method for photographing a moving object with the photographing apparatus.

2. Description of Related Art

Conventionally, photographing apparatuses which are capable of sequentially converting optical images formed by a photographing optical system to image signals by an image pickup device such as a photoelectric conversion device and recording the image signals obtained thereby to a recording medium as image data, for example, a still image or a moving image and which are configured having an image display device for reproducing and displaying the image data recorded in the recording medium as an image, for example, a liquid crystal display (LCD) have been generally put to practical use and become widespread, the photographing apparatuses being, for example, a digital camera, a video camera and the like (hereinafter, these will be generically referred to as a camera).

Since this kind of camera is configured to record a photographed image as electronic data, there is, for example, a merit that it is easy to continuously photograph a moving object, selectively store only desired images from among a large amount of image data obtained as a result of the photographing and discard other unnecessary images.

Recently, the number of pixels of an image pickup device applied to this kind of camera has been considerably increased, and, for example, still image data with a high quality can be acquired from generated moving image data. Furthermore, by cutting out a part of the still image, a still image with a sufficiently high quality can be also acquired.

As for conventional cameras, various photographing apparatuses are proposed, for example, in Japanese Patent Application Laid-Open Publication No. 2007-49408, various photographing apparatuses having a configuration which enables anyone to easily acquire a favorable photographed image by recording an image satisfying a predetermined condition, for example, an image in which an object is photographed in the most desired state (a best shot) or multiple photographed images before and after the image, from among a lot of image data obtained by continuously photographing a moving object.

SUMMARY OF THE INVENTION

A photographing apparatus of one aspect of the present invention includes: an image pickup section picking up an image of an object to acquire image data; a part judgment section judging a particular part of the object in the image shown based on the image data; a change-in-part judgment section judging change over time of the part of the object judged by the part judgment section; and a control section changing a photographing condition in accordance with a result of the judgment by the change-in-part judgment section, wherein the part judgment section judges a first part of the object in the image and a second part presumed from the first part; and the change-in-part judgment section judges change over time of the second part.

A method for photographing a moving object using the photographing apparatus of the one aspect of the present invention includes: a step of generating image data by an image pickup section; a first part judgment step of judging a first part of an object in an image based on the image data; a second part judgment step of presuming and judging a second part of the object in the image based on the image data, from the first part; a change-in-part judgment step of judging change over time of the second part; a step of changing setting of a photographing condition in accordance with a result of the judgment of the change over time of the second part; and a step of recording the acquired image data.

The benefit of the present invention will be more apparent from detailed description below.

BRIEF DESCRIPTION OF THE DRAWINGS

FIG. 12A is a diagram illustrating a typical example of change in behavior in the case where an animal, such as a bird, suddenly moves from a normal motion state and showing the normal motion state (first behavior) of a bird;

FIG. 12B is a diagram illustrating second behavior (a preparation-for-rushing-out period) at the time of the bird starting to move from the normal motion state (the first behavior) in FIG. 12A;

FIG. 12B);

FIG. 14 is a graph showing displacement between an amount and speed of change of each part of an object in the case where the object suddenly moves from a normal motion state (for example, at the time of performing a motion of flying off)

DETAILED DESCRIPTION OF THE PREFERRED EMBODIMENT

Figure 1:
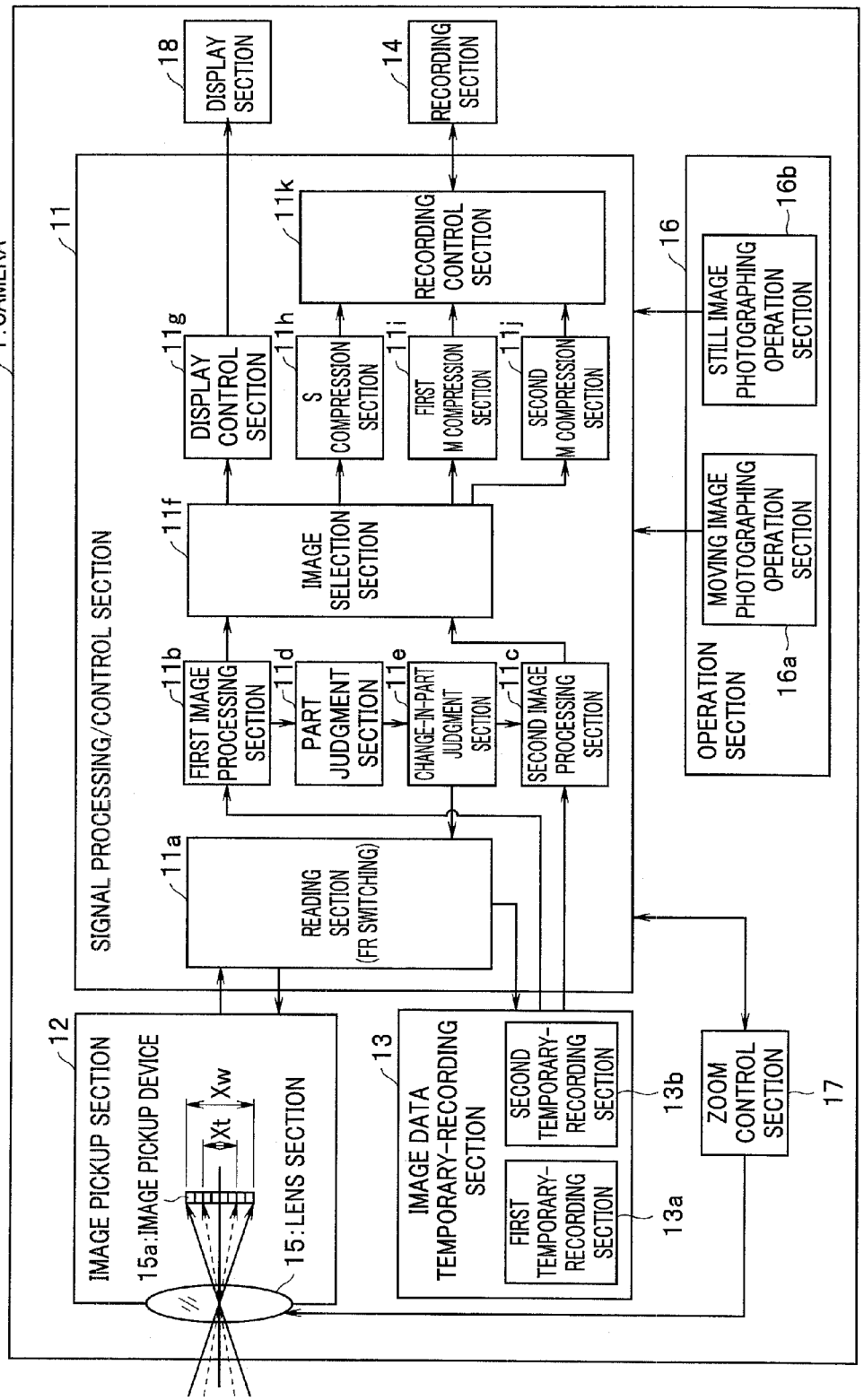
FIG. 1 is a block configuration diagram showing a photographing apparatus (a camera) of one embodiment of the present invention and mainly showing an electrical internal configuration.

One embodiment of the present invention shows an example of a camera which is, for example, a photographing apparatus configured to be capable of performing photoelectric conversion of an optical image formed by an optical lens using a solid-state image pickup device, converting an image signal obtained thereby to digital image data indicating a still image or a moving image, recording the digital data generated in this way to a recording medium, and reproducing and displaying the still image or the moving image on a display device on the basis of the digital image data recorded in the recording medium.

Note that, in each of drawings used in description below, each component may be shown with a different scale so that the component can be of a recognizable size on the drawing. Therefore, as for the number of components, the shapes of the components, the size ratio of the components and relative positional relationships among the respective components shown in the drawings, the present invention is not limited to the shown embodiment.

A schematic configuration of the photographing apparatus (the camera) of the one embodiment of the present invention will be described below. FIG. 1 is a block configuration diagram showing the photographing apparatus (the camera) of the one embodiment of the present invention and mainly showing an electrical internal configuration.

As shown in FIG. 1, a camera 1, which is the photographing apparatus of the present embodiment, is configured mainly by a signal processing/control section 11, an image pickup section 12, an image data temporary-recording section 13, a recording section 14, an operation section 16, a zoom control section 17, a display section 18 and the like.

The image pickup section 12 is configured having a lens section 15, an image pickup device 15a and the like. The lens section 15 is a component unit which transmits light from an object and forms an optical image of the object. Though the lens section 15 is shown being simplified in FIG. 1, it is, for example, an optical lens unit formed by arranging multiple optical lenses on the same optical axis. The lens section 15 is configured including multiple frame members which hold the multiple optical lenses, respectively, and drive mechanisms, drive sources and the like which drive the multiple frame members, respectively. Note that the lens section 15 in the present embodiment is assumed to constitute a so-called zoom lens optical system configured such that optical focal distance can be changed continuously or discretely. Of course, the lens section 15 may be such that switches multiple optical systems. A similar effect can be obtained by electronic zoom for performing cut-out from an image pickup result and using it.

As the image pickup device 15a, a photoelectric conversion device or the like is applied which is a solid-state image pickup device, for example, a CCD image sensor using a circuit element such as a CCD (charge coupled device) or an MOS type image sensor using an MOS (metal oxide semiconductor). The image pickup device 15a causes an object image formed by a flux of light collected by the lens section 15 to be received on a predetermined light receiving surface (an image pickup surface) and performs photoelectric conversion processing for the optically formed image. Here, the image pickup device 15a converts the quantity of light of the object image (an optical image) to an analog signal indicating the quantity of electric charge. The electric signal (an analog image signal) generated by the image pickup device 15a is outputted to a reading section 11a of the signal processing/control section 11.

The signal processing/control section 11 is configured by a control system circuit which performs overall control of each operation sequence of the camera 1, a signal processing system circuit which receives the electric signal (the analog image signal) generated and outputted by the image pickup device 15a and performs various signal processes and the like.

The signal processing/control section 11 is configured, for example, by the reading section 11a, a first image processing section 11b, a second image processing section 11c, a part judgment section 11d, a change-in-part judgment section 11e, an image selection section 11f, a display control section 11g, an S compression section 11h, a first M compression section 11i, a second M compression section 11j, a recording control section 11k and the like.

The reading section 11a is a signal processing section which receives the electric signal (the analog image signal) outputted from the image pickup device 15a and performs processing for reducing reset noise and the like, waveform shaping processing, gain-up processing, AD conversion processing for converting the analog image signal to a digital image signal (image data), and the like. The reading section 11a also functions as a frame rate (FR) switching section which switches a frame rate (FR) at the time of reading a signal of the image pickup device 15a. Image data outputted from the reading section 11a is transmitted to the image data temporary-recording section 13 and temporarily stored in the image data temporary-recording section 13.

The first image processing section 11b is an image data processing section which performs various image processes (such as contrast adjustment processing and color correction processing) for image data (first image data to be described later) read from a first temporary-recording section 13a of the image data temporary-recording section 13. The image data for which the various processes have been performed by the first image processing section 11b is transmitted to the image selection section 11f.

The second image processing section 11c is an image data processing section which performs various image processes (such as contrast adjustment processing and color correction processing) for image data (second image data to be described later) read from a second temporary-recording section 13b of the image data temporary-recording section 13. The image data for which the various processes have been performed by the second image processing section 11c is transmitted to the image selection section 11f.

The image selection section 11f is a circuit section which receives signals from the first image processing section 11b and the second image processing section 11c and selectively controls any of the signals in accordance with a predetermined condition. The image selection section 11f has an image composition function and the like. For example, the image selection section 11f generates a composition-processed image or the like on the basis of multiple image data, as an image to be displayed on the display section 18 via the display control section 11g.

The S compression section 11h, the first M compression section 11i and the second M compression section 11j are data compression processing sections which perform compression processing and the like of image data by a predetermined compression method. Among these data compression processing sections, image data which the S compression section 11h mainly handles is assumed to be still image data. In this case, compression processing is performed by a method in conformity with, for example, the JPEG standard.

Image data which the first M compression section 11i and the second M compression section 11j handle is assumed to be moving image data. In this case, compression and development processes are performed by various methods in conformity with, for example, the Motion-JPEG standard, the H.264 standard and the like. Note that the first M compression section 11i is assumed to mainly handle the first image data (to be described later), and the second M compression section 11j is assumed to mainly handle the second image data (to be described later).

That is, the camera 1 has image processing circuits of two systems so that image processing and the like can be performed for the first image data and the second image data at the same time in parallel.

The display control section 11g is a control circuit section which performs drive control of the display section 18. The display control section 11g receives image data (image data showing a still image or a moving image) selected and set by the image selection section 11f and controls the display section 18 to display the image on a display panel of the display section 18.

The recording control section 11k is a control circuit section which performs drive control of the recording section 14. The recording control section 11k receives output from the S compression section 11h, the first M compression section 11i, the second M compression section 11j and the like and performs control to transfer and record image data to the recording section 14.

The part judgment section 11d identifies a predetermined part of an object, for example, a part corresponding to a face (a first part), the shape of the object and the like on the basis of acquired image data. That is, by referring to a database (an image dictionary) and the like prepared in advance and judging similarity degree or correspondence degree, the part judgment section 11d identifies each of parts (eyes, nose, mouth and the like) forming a part of an object, for example, a face. Thereby, it is also possible to judge the size of the face in a screen.

Furthermore, the direction and inclination of the face is judged from information about arrangement and shapes of these parts, such as positions and balance of the contour. For example, if only one eye can be detected, the face can be judged to be sideways. Furthermore, the part judgment section 11d is a data processing circuit section which identifies and judges classification of an object (for example, a kind such as a human being, a bird, a dog, and a cat) and the like from the image dictionary which is held for each information about the inclination of the face such as a contour, distribution of colors and the like, and presumes the position and state of a body, legs or the like (a second part) from the position of a face. Specifically, for example, what is called face detection means, form detection means or the like is applied to the part judgment section 11d. For example, from information about the size of a face obtained first, the position of a lower back/hip (hereinafter, referred to simply as "lower back") or the position of legs can be estimated, for example, in such a way of thinking that a human body is seen as being seven heads high or eight heads high. At this time, from the kind of an animal judged by the classification judgment and the direction obtained by a result of the inclination judgment, it is possible to judge on which side of the face of the animal (or a human being) the lower back and legs exist. Of course, since the lower back and legs of the animal exist at a part connected to the face, contour information and color information may be used as assistant means for detecting the part connected to the face. If a human being is a target, his lower back exists at a part at a predetermined position below the face based on the size of the face (which can be regarded as a head) when he is in a standing posture.

The change-in-part judgment section 11e is a data processing circuit section which judges positional change and the like (such as an amount and direction) of a particular part identified and judged by the part judgment section 11d in the screen. The judgment can be performed by comparing images continuously obtained and judging where in the screen the positions of similar parts shift at each time.

The image data temporary-recording section 13 is a temporary storage section which receives output (image data) and the like from the reading section 11a and temporarily stores the data. The image data temporary-recording section 13 is mainly configured, for example, by an SDRAM. The image data temporary-recording section 13 is configured having the first temporary-recording section 13a which mainly handles, for example, still image data and the second temporary-recording section 13b which mainly handles, for example, moving image data.

The recording section 14 is a component section for recording various data including image data and is configured by a recording medium, a driving circuit therefor and the like. As the recording medium, for example, a card-shape semiconductor memory which is detachably arranged, a so-called memory card or the like is applied. As for the form of the recording medium, for example, the recording medium may be configured by a medium fixed in the camera, and various forms, such as an optical plate medium and a magnetic medium, can be applied in addition to a semiconductor memory.

The operation section 16 is configured by multiple operation members for performing various operations against the camera 1, corresponding operation switches and the like. When a user operates a predetermined operation member of the operation section 16, a predetermined instruction signal occurs from a corresponding operation switch, and the instruction signal is transmitted to the signal processing/control section 11. Receiving the instruction signal, the signal processing/control section 11 appropriately executes various sequences corresponding to the operation.

Specifically, the operation section 16 includes, for example, operation members such as a moving image photographing operation section 16a used at the time of performing a start or stop operation of moving image photographing and a still image photographing operation section 16b which is a shutter release button, in addition to a power source button, a menu button, a control dial, a mode switching dial, a function button, a reproduction switching button and the like. Furthermore, the operation section 16 includes an operation member for input for inputting various instructions, for example, a touch panel. The touch panel is arranged, for example, being overlapped on the outer surface of the display panel of the display section 18. Note that functions and the like of the various operation members included in the operation section 16 are assumed to be similar to those adopted in conventional photographing apparatuses and the like, and detailed description thereof is omitted.

The zoom control section 17 is a control circuit which mainly controls a zooming operation among operation controls of the lens section 15, in cooperation with the signal processing/control section 11. Therefore, the zoom control section 17 performs drive control of the drive mechanisms, the drive sources and the like which drive the lens section 15, among component units included in the image pickup section 12.

The display section 18 is, for example, configured by the display panel, such as a liquid crystal display device (LCD), and a display driver or the like which performs drive control of the display panel. The display section 18 performs, for example, rec-view display or display such as reproduction display of an image (a still image, a moving image or the like) based on image data (a JPEG file or the like) recorded in the recording medium of the recording section 14 and live view display at the time of performing a photographing operation. The display section 18 also displays a menu for making various settings and operation buttons for the touch panel for performing various operations in conjunction with the touch panel.

Operation at the time of photographing a picture using the camera 1 of the present embodiment configured as described above will be described below.

Figure 2:
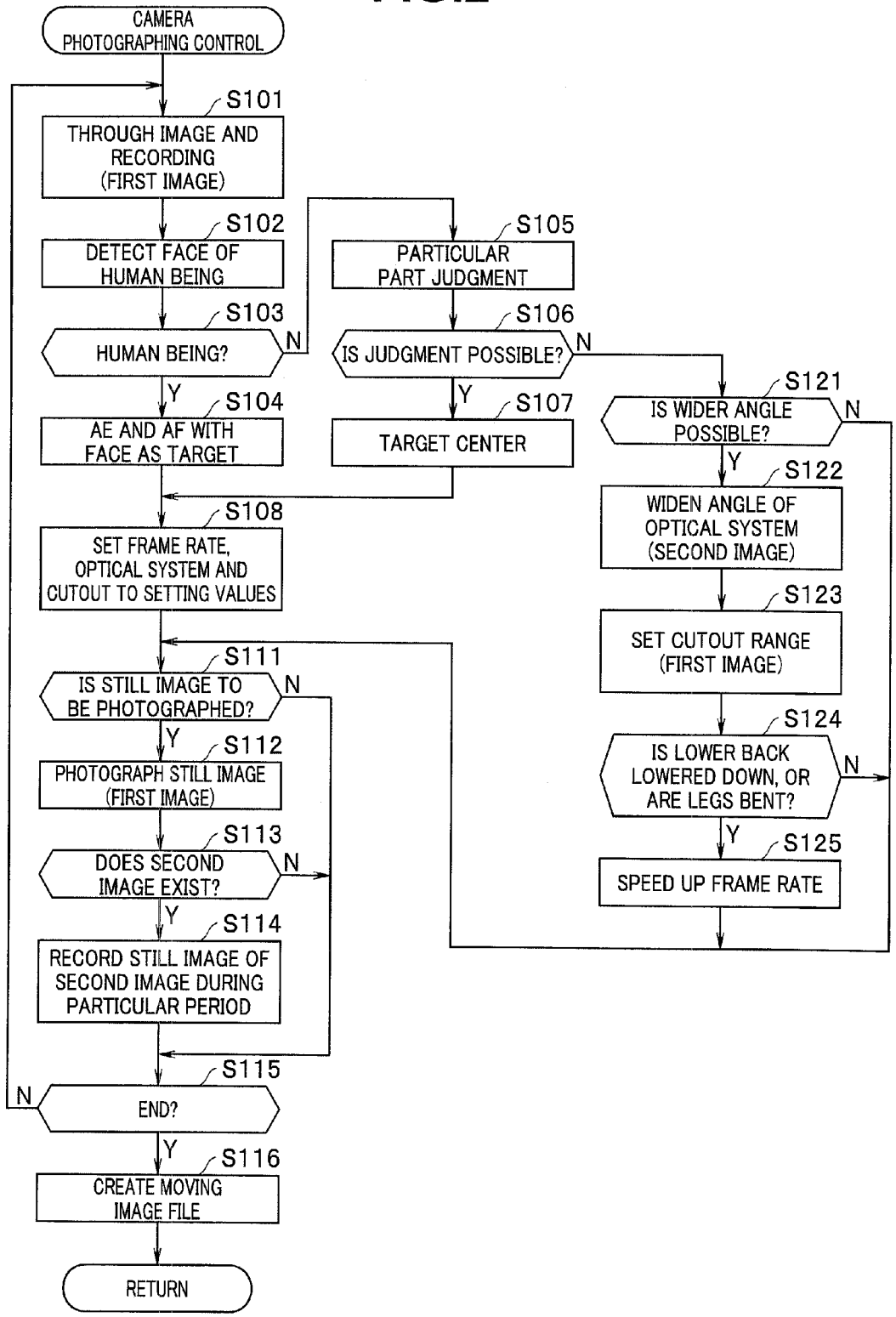
FIG. 2 is a flowchart showing a photographing control sequence of the camera in FIG. 1.
Figure 3:
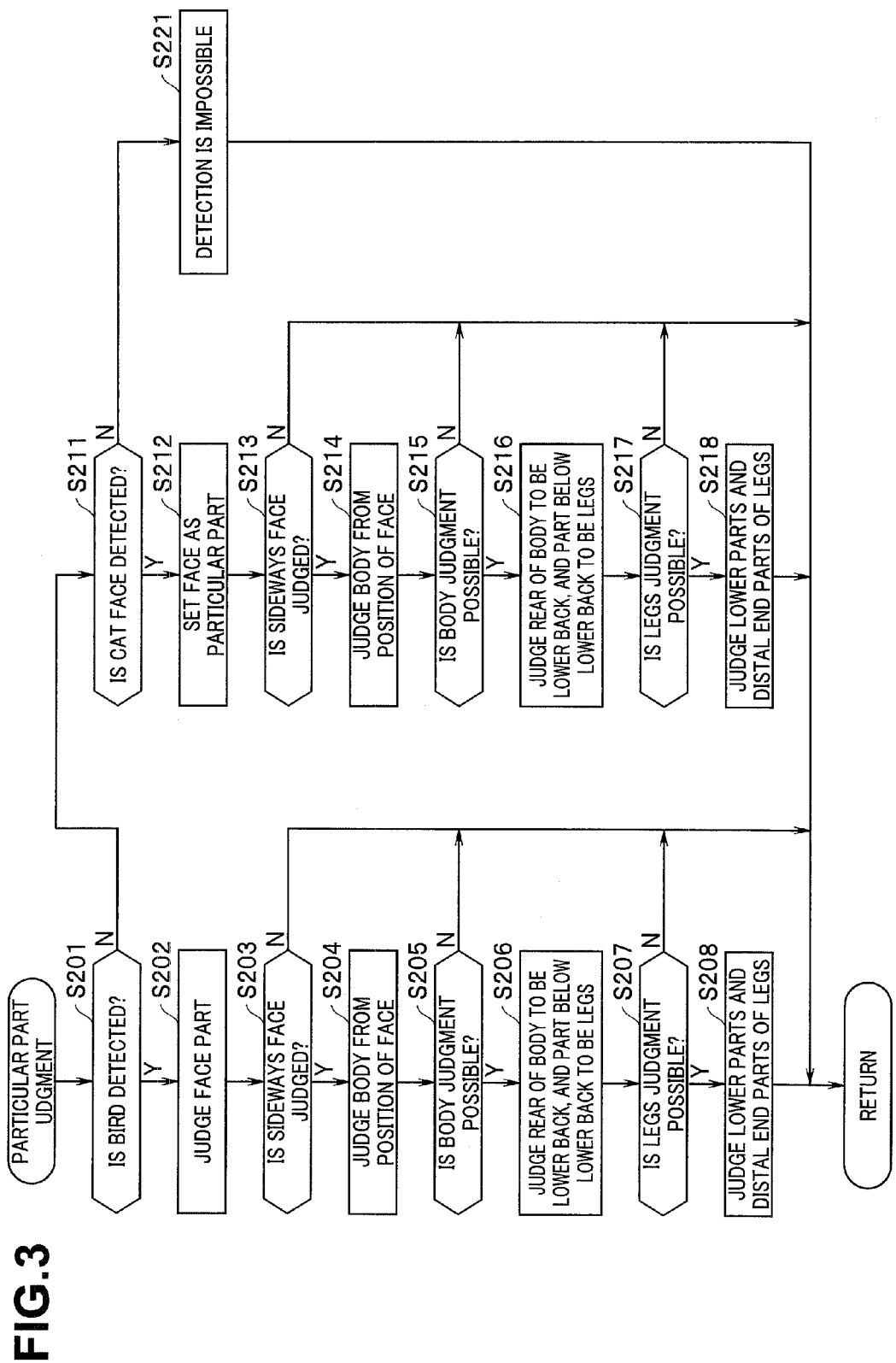
FIG. 3 shows a subroutine of a particular part judgment process sequence (a process of step S105) in FIG. 2.

FIGS. 2 and 3 are flowcharts showing a part of a process sequence of the camera 1 of the present embodiment. FIG. 2 between the flowcharts is a flowchart showing a photographing control sequence of the camera 1. FIG. 3 shows a subroutine of a particular part judgment process sequence, which is the process of step S105 in FIG. 2.

First, it is assumed that the camera 1 is powered on, and the operation mode of the camera 1 is set to a photographing mode. It is assumed that, in this state, the camera 1 always executes display of a through image (a live view image) and an operation of recording a first image (to be described later) (step S101 in FIG. 2). The recording operation executed at this time is temporary recording. Therefore, such operation is being executed that old recording data is deleted when a predetermined amount of recording capacity is exceeded, and a predetermined amount of new recording data is continuously being recorded. Of course, it is possible to record a lot of images depending on design, and thus the deletion may not be performed.

Note that the first image (data) described above is defined to be an image with a predetermined angle of view for which zoom setting has been arbitrarily performed by the user arbitrarily performing zooming setting of the lens section 15 of the camera 1. In comparison, a second image (data) to be described later is defined to be an image in the case where the lens section 15 of the camera 1 is set to focal length on the shortest focal length side (wide-angle end). Though the case of setting the lens section 15 to the wide-angle end is shown as an example to describe the second image here, the second image is not limited thereto. The setting may be changed according to a situation at the time of photographing. In that case also, a particular effect can be expected if a wider angle of view than the angle of view used in current photographing is set. It is not necessarily required to use a zoom lens to obtain an image with a wide angle. It is also possible to prepare a separate optical system or image pickup device with a wide angle of view and use an image obtained therefrom. The second image is an image photographed by the camera for a fail-safe purpose when a photographer fails in photographing (such as in including an object within the screen). To accomplish the purpose, anything is possible if it is something that obtains an image of the object from a wide photographing range.

At step S102, a face of a human being is detected, and at step S103, the part judgment section 11*d* confirms whether a main object in an image is a human being or not. If it is confirmed that the main object is not a human being here, the camera 1 proceeds to the process of step S105 (see the detailed flowchart in FIG. 3). If it is confirmed that the main object is a human being, the camera 1 proceeds to a process of step S104.

At step S104, a normal photographing process which is performed in the case where an object is judged to be a human being, that is, an AE process and an AF process are executed with the face of the human being as a target.

Next, at step S108, the camera 1 sets various setting values, such as a frame rate, an optical system and a cutout range, to predetermined values.

Next, at step S111, the camera 1 confirms whether an instruction to perform a still image photographing operation has been issued or not. In this case, the instruction to perform a still image photographing operation can be confirmed, for example, by monitoring output of an instruction signal of the still image photographing operation section 16*b* of the operation section 16. Here, if the instruction to perform a still image photographing operation has been issued, the camera 1 proceeds to a process of step S112. If an instruction other than the instruction to perform a still image photographing operation has been issued, the camera 1 proceeds to a process of step S115.

When the camera 1 proceeds to the process of S112 in the case where a still image photographing mode is set, a normal still image photographing operation is performed at step S112. Image data targeted here is the first image, that is, image data with an angle of view set by the user.

Next, at step S113, it is confirmed whether the second image exists or not. Here, if the second image which has been photographed with a wider angle of view by assistance of the camera in case the photographer cannot correctly perform photographing, the camera 1 proceeds to a process of next step S114. In the case where the second image does not exist or is not necessary, such as in the case where such assistance is not necessary, the camera 1 proceeds to the process of step S115. The second image is an image obtained by picking up an image from an observation image (an image intended to be photographed) which is obtained by photographing an object large and in which details of the state and movement of the object is judged, even if the whole target is not completely included in the observation image. Any image is possible if detection is possible. An image on the wide angle side is possible if zooming is assumed, and an image photographed by a dedicated separate image pickup section with a wide angle of view is also possible.

At step S114, the camera 1 extracts still image data for a particular period (timing), that is, at a timing of the still image photographing operation instruction at the process of step S111 described above, from the second image data temporarily stored in the second temporary-recording section 13*b* of the image data temporary-recording section 13, and executes a still image recording process for recording the still image data to the recording medium of the recording section 14 as still image data via the second image processing section 11*c*, the image selection section 11*f*, the S compression section 11*h* and the recording control section 11*k* (in a normal process procedure). This is a process of using an image recorded in advance on the assumption of the photographer being slow to respond at the time of performing photographing. Since there may be a case that the photographer performs photographing in haste and misses the timing, acquisition of the second image may be continued after acquisition of the first image.

At step S115, the camera 1 monitors an instruction signal from the operation section 16 and confirms whether a signal of instruction to end the moving image photographing operation being executed is outputted. (As for moving image photographing, since it is only necessary to think about whether or not to leave a result of the recording performed at S101, description about where the moving image photographing is to be started is omitted. It is also possible to continuously perform moving image photographing and record only a moving image during a period selected at S116.) Here, if the signal of the instruction to end the moving image photographing is confirmed, the camera 1 proceeds to a process of step S116. If the signal of the instruction to end the moving image photographing is not confirmed, the camera 1 returns to the process of step S101 described above, and the subsequent process is repeated.

When the signal of the instruction to end the moving image photographing operation is confirmed and the camera 1 proceeds to the process of step S116, the camera 1 executes a moving image file creation process at step S116. In the moving image file creation process, a moving image recording process is executed in which the first image data temporarily recorded in the first temporary-recording section 13*a* of the image data temporary-recording section 13 is extracted, and a moving image recording process for recording the first image data to the recording medium of the recording section 14 as moving image data via the first image processing section 11*b*, the image selection section 11*f*, the first M compression section 11*i* and the recording control section 11*k* (in a normal process procedure) is executed.

Note that, in the moving image file creation process, data may be recorded to the recording medium of the recording section 14 as moving image data from the second image data of the second temporary-recording section 13*b* of the image data temporary-recording section 13 via the second image processing section 11*c*, the image selection section 11*f*, the second M compression section 11*j* and the recording control section 11*k*. In this case, as for moving image recording of the second image data, various patterns are conceivable as a trigger for recording the second image data, such as a form of executing the moving image recording when a recording operation is intentionally performed by the user (for example, an instruction to set an operation mode or a recording operation instruction issued directly) and a form of automatically executing the moving image recording when the second image data exists.

On the other hand, if it is confirmed that the main object is not a human being by the process of step S103 described above, and the camera 1 proceeds to the process of step S105, a particular part judgment process (a detailed process sequence is the subroutine in FIG. 3) is executed at step S105.

Note that, though it is assumed that, in addition to a human being, specifically a bird and a cat can be judged as a main object which can be detected by the part judgment section 11*d* in the camera 1 of the present embodiment, the camera 1 may be adapted to judge other living things, animals and the like. In the case of a human being also, there may be a case where the four limbs are freely used to apply an animal movement, such as in the case of starting running from a posture at start line position, in the case of sports including a jumping motion, such as broad jumping, skating and gymnastics, and in the case of an approach run, a posture or a takeoff before jumping or diving in swimming Therefore, it goes without saying that a way of thinking similar to the above is applicable. In tennis, baseball and soccer, a peculiar movement pattern at the time of hitting a ball is included. In this case also, since a body moves fast and in a big amount, there is a high possibility that the object is not included within the screen, and the present invention can be effectively used. In this case, successive motions can be anticipated by judging what sport is performed from information about the direction or posture of the object. The reason is that there is a particular relation among a direction the object is watchin toward, a part the object moves and a direction the object moves in because the object faces a direction in which he dashes out or a direction in which he intends to aim a ball. In photographing of a bird, a dog, a cat or the like, prompt photographing is required, and the photographer has no time for preparation in advance. The features of the present invention can be more effective. Therefore, a movement of an animal will be described below in detail. As for vertebrate animals which move fast, for example, a frog or a gecko also has four limbs, and its four limbs opposite to its face move strenuously when it tries to move in the direction its face faces. When it tries to move the limbs, the part and a lower back part connecting to the part change in advance.

Note that, as for what animal an observer, that is, a photographer observes with interest, it is more effective at the time of analyzing the target in detail to capture the target with a narrower angle of view in a broader range of the screen.

In order to judge what a main object detected in the screen is, a database or the like stored in advance, for example, in the recording section 14 or another storage section (not shown) is referred to. The database or the like includes various information, such as characteristic shapes and the like about living things, animals and the like which can be a main object. The part judgment section 11*d* refers to the database or the like and judges individual living things, animals and the like to be main objects in the screen. Therefore, if various databases and the like corresponding to living things, animals and the like to be a photographing target, respectively, are prepared in advance, it becomes possible to handle various kinds of objects. In the case of a human being, since various sports are performed in postures peculiar to the sports, respectively, a dictionary for each sport may be held.

At step S201 in FIG. 3, the part judgment section 11*d* of the camera 1 detects whether a main object is a bird or not. Here, if a bird is detected as the main object, the camera 1 proceeds to a process of step S202. Here, if something other than a bird is detected as the main object, the camera 1 proceeds to a process of step S211.

At step S202, the part judgment section 11*d* of the camera 1 performs a process for judging a face section (the first part) of the bird detected as the main object.

First, at step S203, the part judgment section 11d of the camera 1 executes sideways face judgment. Here, if the face is judged to be sideways, the camera 1 proceeds to a process of step S204. If the face is judged not to be sideways, the camera 1 exits the particular part judgment process, returns to the original process sequence, and proceeds to a process of step S106 in FIG. 2.

That is, an example is shown in which the camera 1 of the present embodiment performs prediction of a motion of an object to be described later only when the face of a bird, which is a main object, is sideways. For the motion prediction also, the database or the like described above is referred to. Therefore, by enlarging the database or the like, it is possible to perform the motion prediction according to the direction of the face of a bird.

At step S204, the part judgment section 11d of the camera 1 judges a body part (the second part) from the position of the face part judged by the processes of step S202 and S203 described above.

At step S205, it is confirmed whether the body part judgment is possible or not. Here, if the body part judgment is possible, the camera 1 proceeds to a process of step S206. If the body part judgment is impossible, the camera 1 exits the process sequence, returns to the original process sequence, and proceeds to the process of step S106 in FIG. 2.

At step S206, the part judgment section 11d of the camera 1 judges the rear of the body part, that is, a part on the horizontally opposite side of the part of the face to be a lower back and judges a part on the lower side of the lower back to be legs. In order to dash out in the direction the face faces, it is necessary to move a part on the opposite side. Therefore, monitoring attaching great importance thereto is important. Especially in the case of a vertebrate animal, a head part (including a face) exists at the tip of its vertebra, and a leg part exists on the opposite side thereof.

Next, at step S207, the part judgment section 11d of the camera 1 confirms whether legs judgment is possible or not. Here, if the legs judgment is possible, the camera 1 proceeds to a process of step S208. If the legs judgment is impossible, the camera 1 exits the process sequence, returns to the original process sequence, and proceeds to the process of step S106 in FIG. 2.

At step S208, the part judgment section 11d of the camera 1 performs judgment of lower part areas and distal end parts of the legs. Here, as the process for judging a particular part (the lower parts of legs, the distal end parts of legs and the like), judgment is performed by image analysis, for example, analysis of positional difference from a judgeable part, contours, colors and contrast. After that, the camera 1 exits the process sequence, returns to the original process sequence and proceeds to the process of step S106 in FIG. 2.

Especially in the case of performing grooming, the face is set toward the body. However, in the case of flying off, the bird looks toward the direction of flying off, and the bird disappears suddenly or spreads its wings and flies to the outside from the screen. A scene which the photographer easily fails in photographing in such a situation can be easily detected according to the present invention. Though description is made here on the assumption of a motion of flying off as a typical example of a movement which is not completely included within a small angle of view (a large movement), a movement to be a sign in this case is a movement of a part where strength is put at the time of flying off (for example, a leg part), and, in many cases, the part exists opposite to the direction the face faces. In the case of a human being, however, there may be a case where he jumps up and down while facing front. In this case also, he seldom faces down, and his legs and lower back in a direction different from the direction of the face largely change.

On the other hand, if something other than a bird is detected as a main object at step S201 described above, and the camera 1 proceeds to the process of S211, the part judgment section 11d of the camera 1 confirms whether the main object is a cat or not, that is, the face of a cat (the first part) has been detected or not at step S211. Here, if a cat face is detected as the main object, the camera 1 proceeds to a process of step S212.

At step S212, the part judgment section 11d of the camera 1 continues the subsequent judgment process with the cat face which is the main body as a particular part.

That is, first, at step S213, the part judgment section 11d of the camera 1 executes sideways cat face judgment. The sideways cat face judgment is almost similar to the process of step S203 described above.

Here, if a sideways face is judged, the camera 1 proceeds to the next process of step S213. If the face is judged not to be sideways, the camera 1 exits the particular part judgment process, returns to the original process sequence, and proceeds to the process of step S106 in FIG. 2.

Next, at step S214, the part judgment section 11d of the camera 1 judges a body part (the second part) from the position of the face part (the first part). This process is almost similar to the process of step S204 described above.

At step S215, it is confirmed whether the body part judgment is possible or not. This confirmation process is almost similar to the process of step S205 described above.

Here, if the body part judgment is possible, the camera 1 proceeds to the process of step S216. If the body part judgment is impossible, the camera 1 exits the process sequence, returns to the original process sequence and proceeds to the process of step S106 in FIG. 2.

At step S216, the part judgment section 11d of the camera 1 judges the rear of the body part, that is, a part on the horizontally opposite side of the part of the face to be a lower back and judges a part on the lower side of the lower back to be legs. This confirmation process is almost similar to the process of step S206 described above.

Next, at step S217, the part judgment section 11d of the camera 1 confirms whether legs judgment is possible or not. This confirmation process is almost similar to the process of step S207 described above.

Here, if the legs judgment is possible, the camera 1 proceeds to the process of step S218. If the legs judgment is impossible, the camera 1 exits the process sequence, returns to the original process sequence and proceeds to the process of step S106 in FIG. 2.

At step S218, the part judgment section 11d of the camera 1 performs judgment of lower part areas and distal end parts of the legs. This confirmation process is almost similar to the process of step S208 described above. After that, the camera 1 exits the process sequence, returns to the original process sequence and proceeds to the process of step S106 in FIG. 2.

A technique of, in a photographing apparatus, detecting a human being's face area existing in an image on the basis of image data acquired by an image pickup device, judging that the face area is a human being's face and identifying and judging that the judged human being's face is a particular person's face or a smiling face has been already established.

For living things other than a human being, animals and the like, it is also possible to perform detection and judgment of a face by detecting shades, an arrangement pattern and the like of respective parts constituting the face, for example, eyes, a nose, a mouth and the like. That is, in view of the fact that each of parts constituting the face of various kinds of living things, animals and the like differs according to the kind of each living thing, animal and the like, it has become possible in recent years to judge the various kinds of living things, animals and the like by analyzing two-dimensional image data.

Furthermore, for various living things, animals and the like, if a configuration is made in which various variation face patterns, such as a profile pattern, are accumulated in a database or the like in addition to a front face pattern so that the variation face patterns can be referred to, it is easily possible to detect a profile and the like.

As a specific example in addition to the above techniques, for example, in the case of a relatively small-size bird, the whole bird can be easily included within the screen, and, therefore, it is possible to judge whether an object in the screen is a bird or not by performing pattern matching or the like, for example, about whether its body has a peculiar streamline shape or about a characteristic movement pattern or the like on the basis of an obtained whole image of the object included within the screen.

Birds often have a tendency to have a peculiar movement pattern such as moving the body (wings) or the face frequently while stopping movement of the legs. From this, it is possible to judge an image area corresponding to a face part of a bird in the screen by referring to the database for characteristic motion patterns and performing pattern analysis.

Furthermore, if a database or the like in which information about characteristic forms, such as a triangular bill in a uniform color being arranged at the tip of a face part, are accumulated is prepared, it is possible to detect an object on the basis of a form correspondence degree by pattern recognition and perform a process of judging a profile of a bird.

If a face part pattern of an object, which is a bird, is judged in this way, the size of the face (an occupied area in the image or the like) is estimated next, and the position of a body part can be judged from information about the direction, size and the like of the face. For example, the form of a body part of an animal with a profile face can be presumed to be mostly horizontally long and a leg part can be presumed to exist at a lower part of the moving object. Furthermore, by detecting the size of a face after detecting the face, an area with a predetermined length based on the size of the face, for example, a horizontally long area with a length about five times as long as the face width can be presumed to be a body part. Aside from this, for example, in the case of detecting a face, an area in a particular direction based on the position of the face or a direction the face faces (a line-of-sight direction), for example, an area nearer to the bottom of the screen than the position of the face and in a direction opposite to the direction the face faces can be presumed to be a body part.

Anyway, in order to sufficiently observe such a target that its movement is to be judged, it is better to narrow the angle of view and monitor the target large to see the state well. However, there is a problem that the target is not included within the narrow angle of view if it moves strenuously.

On the other hand, if it is confirmed that the main object is not a cat face at the process of step S211 described above, the camera 1 proceeds to a process of step S221.

At step S221, judging that it is impossible to detect the kind of the main object, the camera 1 returns to the original process sequence and proceeds to the process of step S106 in FIG. 2.

When returning to step S106 in the process sequence in FIG. 2 from the particular part judgment process in FIG. 3 in this way, the camera 1 confirms at step S106 whether the particular part judgment was possible or not in the process in FIG. 3. Here, if the particular part judgment was possible, the camera 1 proceeds to a process of step S107. If the particular part judgment was impossible, the camera 1 proceeds to a process of step S121.

At step S107, the camera 1 executes an AE process and an AF process with a central area of the screen as a target. After that, the camera 1 proceeds to the process of step S108 described above.

On the other hand, at step S121, the camera 1 confirms a zoom state set currently and confirms whether an optically wider angle is possible or not. Here, if a wider angle is possible, the camera 1 proceeds to a process of step S122. If a wider angle is impossible, the camera 1 proceeds to the process of step S111 described above.

At step S122, the camera 1 performs drive control of the lens section 15 via the zoom control section 17 and executes an angle-widening process for an optical system. In this case, the focal length of the lens section 15 to be set is the widest angle that can be set. As described above, an image displayed on the basis of image data obtained then is the second image.

At step S123, the camera 1 sets a cutout range. Here, the cutout range is a range corresponding to the first image. That is, at this time point, the lens section 15 has been set to the widest angle by the process of step S122 described above, and an image pickup range is a range indicated by a symbol Xw shown in FIG. 1.

Therefore, an angle-of-view range to be displayed on the display section 18 is assumed to be an angle-of-view range corresponding to a zoom value set by the user before, that is, corresponding to the first image. Here, the angle-of-view range is assumed to be a range indicated by a symbol Xt shown in FIG. 1. Therefore, processing for cutting a predetermined range from an actual image pickup range, that is, the second image data and making it the first image data is performed. Then, processing is performed so that an image corresponding to the first image data is displayed on the display section 18. A cutout range setting process is performed for that purpose. Therefore, the cutout range corresponds to a photographing range of the first image corresponding to a zoom value set by the user.

At step S124, the change-in-part judgment section 11e of the camera 1 performs a process for judging change in a predetermined part of the main object. In this case, for example, a motion of lowering down a lower back part or a motion of bending legs is detected as a motion of a predetermined part.

If the motion of lowering down a lower back or the motion of bending legs is detected at the process of step S124 described above, the camera 1 proceeds to a process of step S125. If the change in motion described above is not confirmed, the camera 1 proceeds to the process of step S111 described above.

At step S125, the reading section 11a of the camera 1, for example, speeds up the frame rate for a process of reading data from the image pickup section 12. After that, the camera 1 proceeds to the process of step S111. Note that there is a possibility that a high-quality image cannot be maintained only by simply speeding up the frame rate. For example, appropriate exposure cannot be obtained. Therefore, when the frame rate switching process by the reading section 11a is executed, the signal processing/control section 11 of the camera 1 simultaneously changes settings of parameters related to exposure setting among photographing condition parameters, for example, a sensitivity setting value, an aperture value and the like.

Here, simple description will be made on a state at the time of a bird, a cat or the like in a normal motion state is starting a motion. FIGS. 4 to 7 are diagrams showing an example of operation in the case where a living thing, such as a bird, is a main object at the time of photographing a picture using the camera 1 of the present embodiment. FIGS. 8 to 11 are diagrams showing another example of operation in the case where a living thing, such as a cat, is a main object at the time of photographing a picture using the same camera 1.

In FIGS. 4 to 11, an image in a frame indicated by reference numeral 14a is assumed to be the second image (an image with the widest angle). An image in a frame indicated by reference numeral 14b is assumed to be the first image (an image by set zoom). Note that the frame of the first image 14b changes according to a set zoom value. The maximum range in that case is the same as the range of the second image 14a (the widest-angle range). Note that, though the second image is assumed to be an image of the widest-angle range in this example, this may be changed according to a situation at the time of photographing. In this case, a particular effect can be expected if a wider angle than the angle of view used in current photographing is set.

Figure 4:
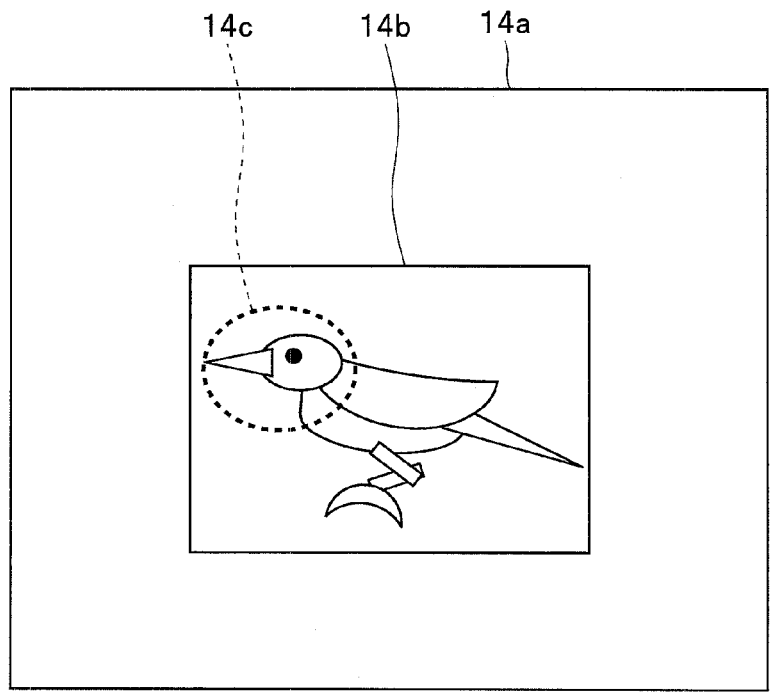
FIG. 4 is a diagram showing an example of operation in the case where a living thing, such as a bird, is a main object at the time of photographing a picture using the camera in FIG. 1 and showing a state in which a face part of the bird is detected.

A state shown in FIG. 4 shows a state in which a face part of a bird has been detected. In FIG. 4, reference numeral 14c indicating a dotted-line circle is an indicator showing a detected face area of a bird. This state corresponds to the process from steps S201 to S202 in the process sequence in FIG. 3. Information about the size of the face may be detected then to use the information as a reference of detection of various positions and judgment of various lengths. Of course, the size of a part of a body other than the face may be used instead.

Figure 5:
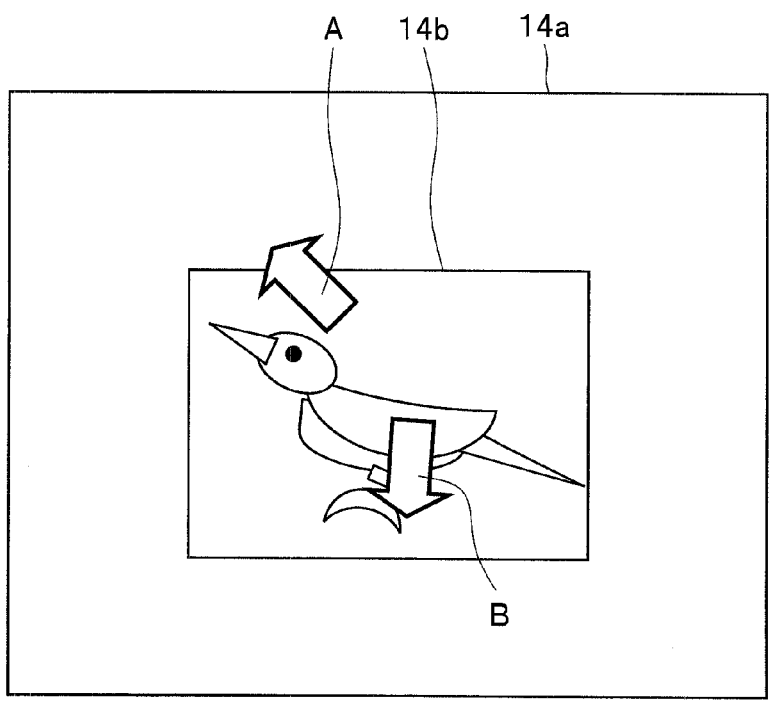
FIG. 5 is a diagram showing that the bird, which is the main object, detected in a screen is preparing to start a motion of flying off after the state in FIG. 4.

When the state in FIG. 4 transitions to a state in FIG. 5, the bird, which is a main body detected in the screen, is preparing to start to perform a flying-off motion. When a bird flies off from a normal motion state, it performs characteristic motions, for example, a motion of turning its face to a flying-off direction (an arrow A), a motion of bending its legs and lowering down its lower back (an arrow B) or the like.

Figure 6:
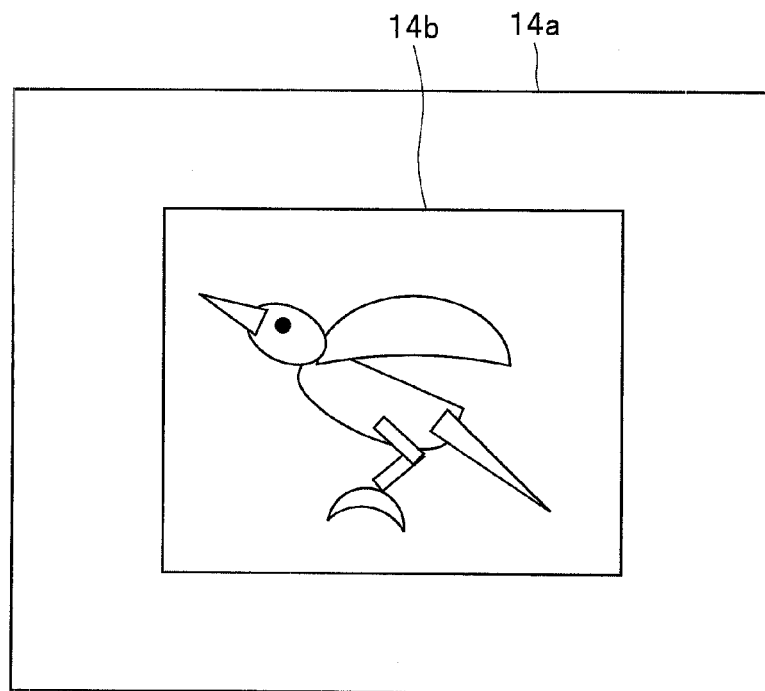
FIG. 6 is a diagram showing a first stage of the motion of the bird actually flying off after the motion in FIG. 5.
Figure 7:
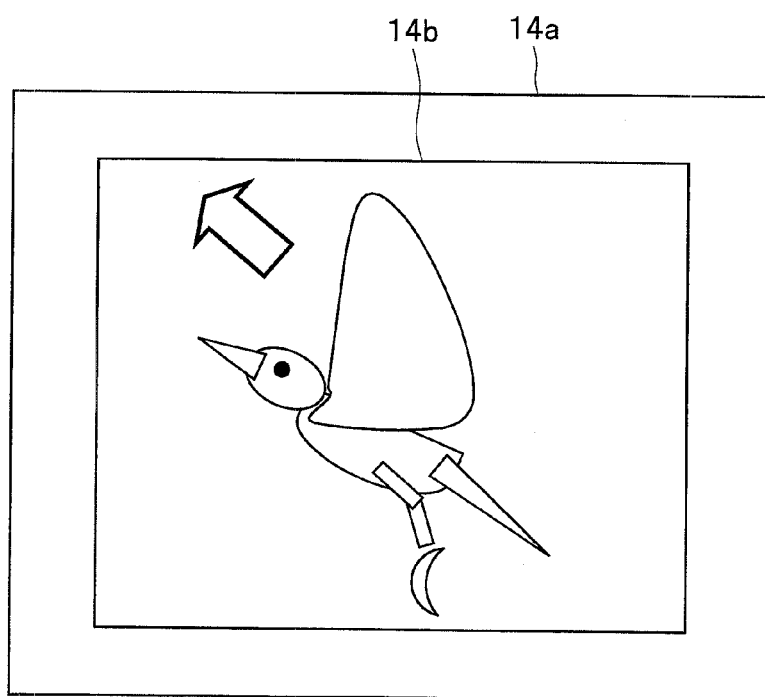
FIG. 7 is a diagram showing a second stage of the motion of the bird actually flying off after the motion in FIG. 6.

After that, from a state in FIG. 6 to a state in FIG. 7, the bird actually performs a flying-off motion. In this case, in the state in FIG. 6, the bent legs stretch as well as the wings starting to stretch. In the state in FIG. 7, the legs completely stretch, and the bird flies off with the wings stretching wide. Then, the bird flies off in the direction of the arrow A. At this time, the bird as a main object stretches its wings and simultaneously moves to one direction (the direction of the arrow A) at a high speed. Since the part judgment section 11d has a function of continuing to follow and detect a detected part, the cutout range setting may be changed so that the whole image of a moving object is included in association with the detection by following. That is, as for the cutout range, a result of judgment by the change-in-part judgment section 11e may be reflected so that the cutout range of the first image corresponding to a zoom value based on the user's setting operation may be zoomed out to be slightly shifted to the wide angle side.

Figure 8:
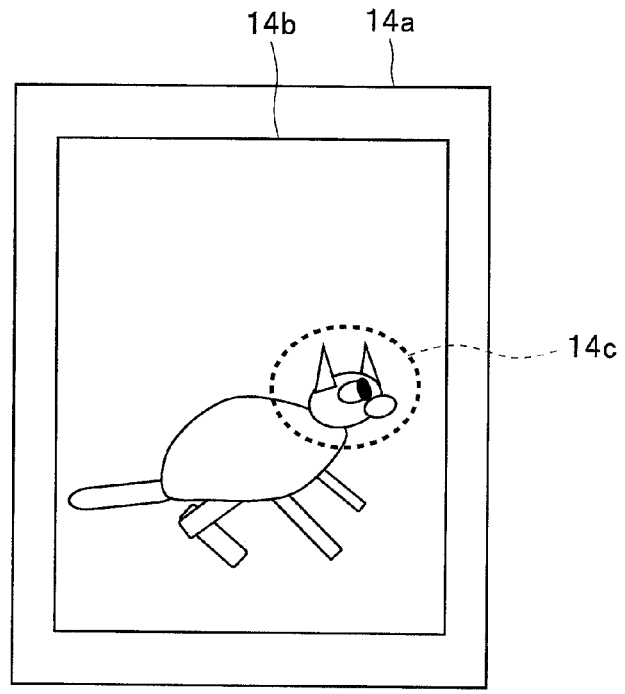
FIG. 8 is a diagram showing another example of operation in the case where a living thing, such as a cat, is a main object at the time of photographing a picture using the camera in FIG. 1 and showing a state in which a face part of the cat is detected.

Similarly, a state shown in FIG. 8 shows a state in which a face part of a cat has been detected. In FIG. 8, reference numeral 14c indicating a dotted-line circle is an indicator showing a detected cat face area. This state corresponds to the process from steps S211 to S212 in the process sequence in FIG. 3.

Figure 9:
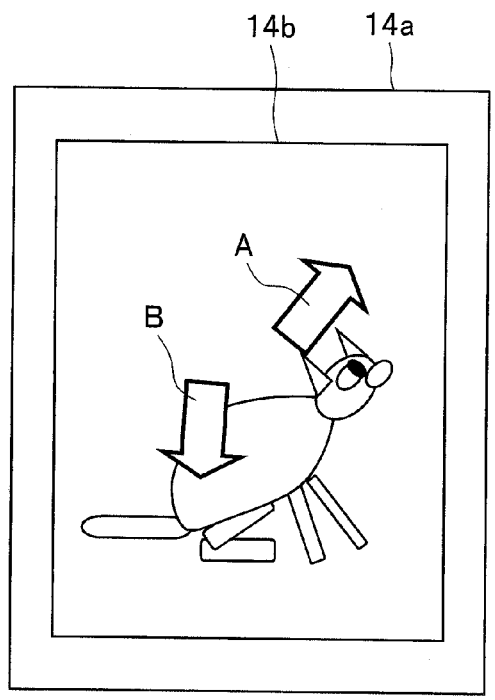
FIG. 9 is a diagram showing that the cat, which is the main object, detected in the screen is preparing to start a motion of jumping up after the state in FIG. 8.

When the state in FIG. 8 transitions to a state in FIG. 9, the cat, which is a main body detected in the screen, is preparing to start to perform a jumping-up motion. When a cat jumps up from a normal motion state, it performs characteristic motions, for example, a motion of turning its face to a jumping-up direction (an arrow A), a motion of bending its hind legs and lowering down its lower back (an arrow B) or the like.

Figure 10:
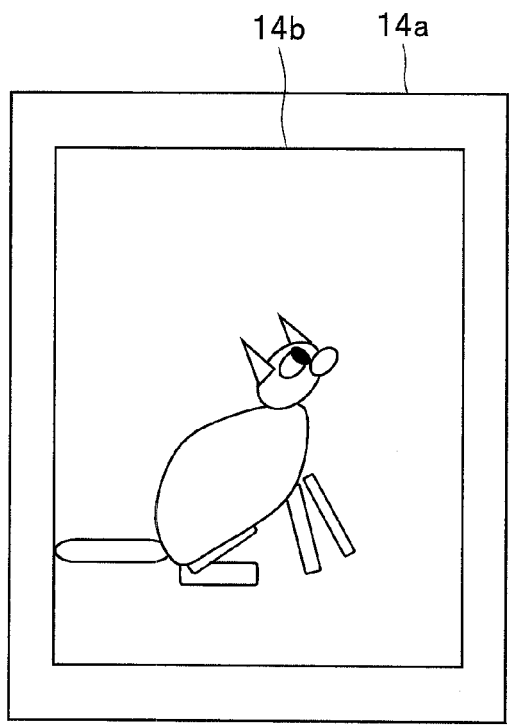
FIG. 10 is a diagram showing a first stage of the motion of the cat actually jumping up after the motion in FIG. 9.
Figure 11:
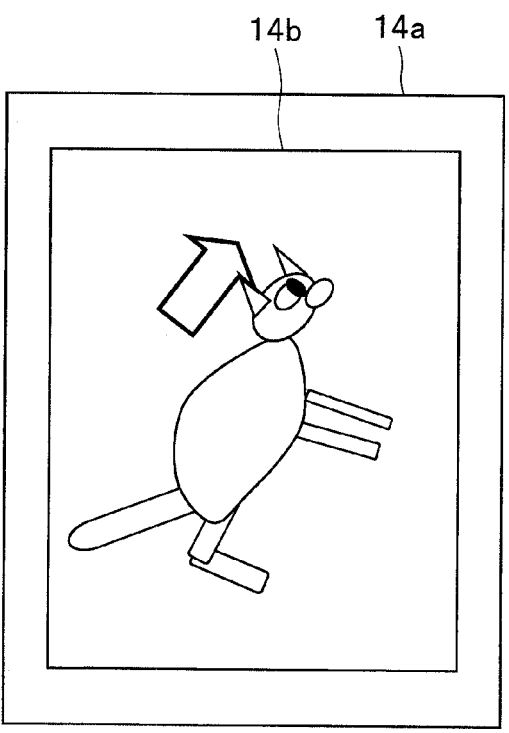
FIG. 11 is a diagram showing a second stage of the motion of the cat actually jumping up after the motion in FIG. 10.

After that, from a state in FIG. 10 to a state in FIG. 11, the cat actually performs a jumping-up motion. In this case, in the state in FIG. 10, the bent hind legs begin to stretch, and, in the state in FIG. 11, the hind legs stretch more as well as the upper body stretching up. Then, the cat jumps up into the direction of the arrow A.

As described above, in the case of an animal which moves fast, such as a bird and a cat, even if moving image photographing of a motion performed after the respective states in FIGS. 6 and 10 transition to the respective states in FIGS. 7 and 11 is performed at the normal frame rate and a predetermined one frame during the moving image photographing is taken out as a still image, so-called object blur occurs, and it is difficult to certainly capture the moment of the movement because the speed of the motion of the object is very fast.

Therefore, in the camera 1 of the present embodiment, a movement at the time of an object being photographed transitioning to a sudden motion, specifically, for example, a motion of turning a face to a direction of flying off or jumping up or a motion of bending a leg part and lowering down a lower back is detected (the process of step S124 in FIG. 2) as described above. When such a motion is detected, a photographing operation is continued with a setting suitable for photographing an object which moves fast, for example, by automatically performing setting for speeding up a frame rate (the process of step S125 in FIG. 2).

An example of specific means for a process of predicting a movement performed when an object being photographed transitions to a sudden motion (the process of S124 in FIG. 2) will be described below.

Figures 13A, 13B:
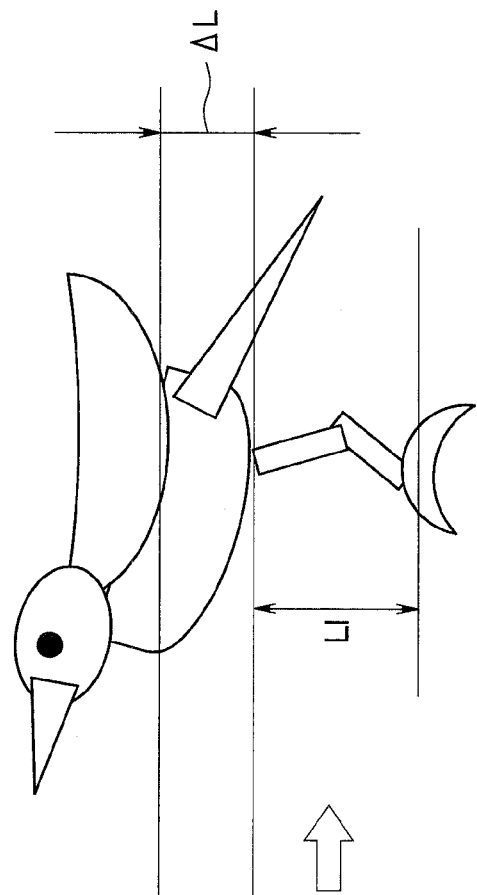
FIG. 13A is a diagram corresponding to the state in FIG. 12B (the preparation period)
FIG. 13B is a diagram illustrating third behavior (a flying-off period) which continues from the state in FIG. 13A (the preparation period.

FIGS. 12A, 12B, 13A and 13B are diagrams illustrating a typical example of change in behavior in the case where an animal, such as a bird, suddenly moves from a normal motion state. Among these, FIGS. 12A and 12B are diagrams illustrating second behavior (a preparation-for-rushing-out period: FIG. 12B) performed at the time of a bird starting to move from a normal motion state (first behavior: FIG. 12A), and FIGS. 13A and 13B are diagrams illustrating third behavior (a flying-off period: FIG. 13B) that the bird subsequently performs from the state in FIG. 12B (a preparation period: FIG. 13A). Note that, in FIGS. 12A, 12B, 13A and 13B, description is made with a bird as a specific example of animal.

In general, as for an amount of change in a direction an object mainly moves (a height direction in the example in FIGS. 12A, 12B, 13A and 13B) at the time of a bird flying off from a normal motion state, there is a tendency that an amount of movement $\Delta L$ at the time of stretching/contracting legs (FIG. 13B) is much larger in comparison with an amount of movement $\Delta H$ at the time of bending legs and lowering down a lower back part (FIG. 12B).

For example, at the time of performing behavior of adjusting the direction of a face to a flying-off direction, from the normal motion state in FIG. 12A to the state in FIG. 12B, $\Delta H$ can be expressed as follows:

$\Delta H = (1/2) \cdot Lb \cdot \tan \theta b$ wherein the angle of the direction of the face (that is, the angle of the vertebra against a horizontal line) is indicated by θb, and the length of a back part defined by the vertebra of the bird as an object is indicated by Lb. In this case, the size of the face may be used instead of the length of the back part.

Here, if approximately θb=45° is assumed, ΔH changes by only about half the length of the back part.

On the other hand, the length of the leg is a length L1 corresponding to the length from its root part to its distal end part (FIG. 13B). For the leg part length L1 is, for example, almost equal to the length of the vertebra length Lb. The length of the vertebra may be estimated from the size of the face by using databases classified according to kinds of animals or the like.

Furthermore, as shown in FIG. 13B, since it is possible to easily change the legs from a state in which the legs are completely bent being folded to a state in which the legs are stretched almost straight by the joint parts of the legs, the amount of rushing-out direction change ΔL caused by stretching/contracting the legs corresponds to the leg length L1. Note that the leg length may be judged from the size of the face. For example, the leg length may be roughly calculated on the assumption that it is about three times as long as the size of the face.

Furthermore, in this case, the motion of stretching wings and the like are also added, as described above. However, since these motions also have an amount of extremely fast change, it is not possible to capture the motions by photographing at the normal frame rate.

FIG. 14 is a graph showing displacement between an amount and speed of change of each part of an object in the case where the object suddenly moves from a normal motion state (for example, at the time of performing a motion of flying off). In FIG. 14, it is sufficiently possible to cope with the state between a normal motion state period (a first behavior period) indicated by a symbol (I) and a preparation-for-flying-off period (a second behavior period) indicated by a symbol (II) by photographing at the normal frame rate (FR). However, it is not possible to capture the state during the subsequent flying-off period (a third behavior period) indicated by a symbol (III) by the photographing at the normal frame rate.

As described above, it is not possible to capture a state by photographing at the normal frame rate at a timing immediately after a legs bending and stretching motion of a bird occurs. Therefore, the present embodiment is configured so that, by paying attention to a motion at a timing immediately before the legs bending and stretching motion, for example, change in the vertebra angle θb shown in FIG. 12B (a motion of lowering down a lower back part) or a characteristic motion such as a motion of bending legs, such a motion change is detected and judged. In order to detect the motion change, a situation is desirable in which, for example, change in a lower back part is seen well. Therefore, it is effective that an object animal such as a bird and a cat stays sideways. That is the reason why, at each of the processes of steps S203 and S213 in the process sequence in FIG. 3, it is judged whether a main object stays sideways with the part judgment section 11d.

Figure 15:
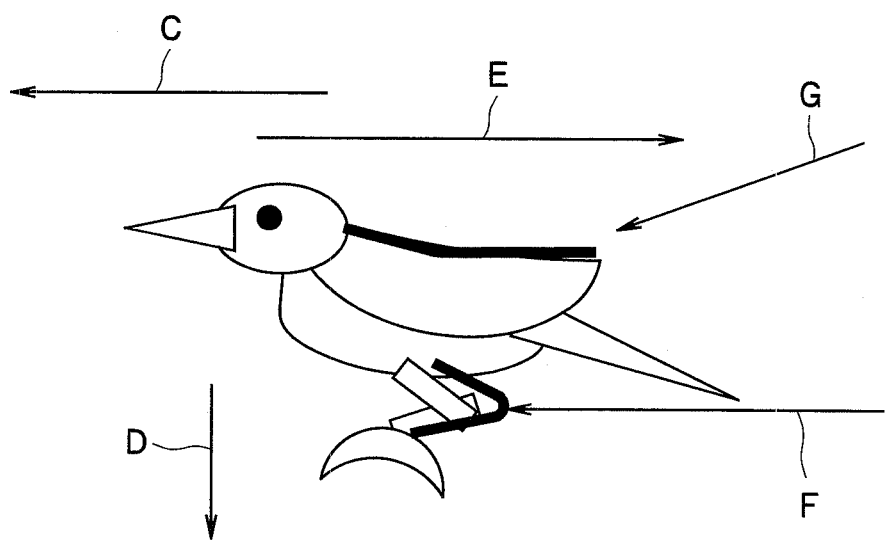
FIG. 15 is a diagram showing a concept at the time of judging each part and a direction of each part when an animal as a main object (in this example, a bird) stays sideways.

For example, FIG. 15 is a diagram showing a concept at the time of judging each part and a direction of each part when an animal (in this example, a bird) stays sideways.

In the case of photographing an animal (in the present example, a bird) staying sideways as a main object as shown in FIG. 15, judgment about whether its face is sideways or not (steps S203 and S213 in FIG. 3) can be performed by judging a direction which the acute angle of an almost triangular bill points at (a direction of an arrow C in FIG. 15) to be a direction of a face, for example, in the case of a bird.

When the direction of the face is judged in this way, judgment of the position of a body (steps S204 and S214 in FIG. 3) is performed. The position of the body is judged as such a part that the outline with a predetermined length continuously extends toward a direction (the direction of an arrow E in FIG. 15) opposite to the direction of the face (the direction of the arrow C in FIG. 15) (a part shown by an arrow G in FIG. 15). The "predetermined length" in this case may be judged with the use of the size of the face detected at the time of face detection. The length may be roughly calculated as being about three times as long as the size of the face.

When the position of the body is judged in this way, judgment of the positions of a lower back and legs (steps S206 and S216 in FIG. 3) is performed next. The position of the lower back is judged as a part at the rear of the position of the body (a direction opposite to the face: the direction of the arrow E), and the position of the legs is judged on the assumption that they exist below the lower back position (the direction of an arrow D in FIG. 15).

Note that the position of lower back is slightly near the center of a body though it is at the rear of the body in the case of a biped animal such as a bird while the position is near the end part at the rear of a body in the case of a quadruped animal such as a cat. In the case where legs are bent being folded, there may be a case that judgment of the position of the legs is difficult (steps S207 and S217 in FIG. 3). Therefore, in judgment of the position of legs, if, for example, there is a part which exists below a body and the outline of which continuously extends, the part is judged to be legs (a part shown by an arrow F in FIG. 15). Here, judgment of a particular part (the position of legs or a lower back, and the like) is performed by image analysis, for example, analysis of positional difference from a judgeable part, contours, colors and contrast.

As described above, according to the one embodiment described above, the camera 1 of the present embodiment executes a normal photographing operation when, at the time of performing moving image photographing with a moving object such as a small-size animal, for example, a bird, a dog or a cat as an object, the object is in a still state or a normal state in which the object's motion is inactive (hereinafter simply referred to as a normal motion state). During the execution of the normal photographing operation, motions of the object targeted by the photographing is always monitored on the basis of sequentially acquired image data, and a movement of the object targeted by the photographing is predicted. Then, if it is detected that the object being photographed performs such a movement that is performed at the time of transitioning to a sudden motion, settings of the camera 1 are automatically switched so that settings suitable for photographing an object moving fast (for example, speedup of the frame rate as well as change in sensitivity and aperture, change in photographing parameters accompanying the change, and the like) are made, and the photographing operation is continued. Furthermore, in respond to the change in the motion, the photographing range is changed.

According to the above, during execution of a moving image photographing operation, a movement of an object is monitored to predict a movement of the object, and photographing setting is changed according to the speed of the movement of the object to perform photographing. Therefore, a moving image acquired in this way can be appreciated as a high-quality still image without blur even if the moving image temporarily stops at the time of reproduction. Furthermore, if a desired one image is extracted from the moving image and recorded as a still image, a high-quality still image equal to an ordinary still image can be obtained. Furthermore, in addition to an image based on a set zoom value, an image for which the widest angle end by an attached zoom lens is set is simultaneously recorded. At the time of extracting a still image, the extraction is performed on the basis of an image recorded with the widest angle, and the image never becomes such an image that an object is not completely included within the screen.

Note that, though description has been made on motions of a living thing other than a human being, an animal or the like, specifically, a bird, a cat or the like as a main body, as an example in the one embodiment described above, the present invention is similarly applicable to a motion of a human being as a target. That is, in the present invention, detection of a face and detection of parts of a body are effectively utilized in two meanings. That is, it is possible to judge a direction in which an object is going to act or a target an object aims at, from the direction of the face of the object. Then, a part assumed to move is predicted from the direction or the target. Information about where the part exists can be also obtained from the result of detection of the face. In a scene of jumping or the like, the body exists in a direction different from a direction the face faces, and the part is connected to the body, and its position can be estimated on the basis of the size of the face obtained as an image.

Therefore, by providing an image pickup apparatus including an image pickup section picking up an image of an object to acquire image data, a part judgment section judging the direction and size of a face part of the object in an image shown on the basis of the image data, and a control section monitoring a particular part different from the face and changing a photographing condition according to a result of judgment of change over time of the particular part, or a method for controlling the image pickup apparatus, such prevention of failure becomes possible.

A part of the body which is important for prediction of a movement here is the part of the body of the object detected in a direction opposite to or different from the direction of the face judged by the part judgment section. A part of the body which is important for prediction of a movement here is the part of the body of the object detected on the basis of the size of the face. The present invention utilizes the fact that, since the object dashes out in the direction the face faces, a great movement change appears at a part of the body in the opposite direction. Therefore, it is possible to not only simply widen the angle of view but also widen the angle of view toward the direction in which the object dashes out. It goes without saying that such enlargement of a range where image pickup is possible is advantageous when a next motion is further judged.

It goes without saying that, when the photographing range is always enlarged, it becomes difficult to judge a small movement. It goes without saying that, in order for the photographer to sufficiently detect a movement of a target which he wants to observe, it is necessary to enlarge the particular target so that how various part's changes can be sufficiently observed and judged. Therefore, it is a very important point to confirm a small movement with a narrow angle of view before a large motion occurs.

In other words, it can be said that an image pickup apparatus is provided, which is capable of judging that a target will make a large movement, from the size and direction of its face detected in accordance with a result judged with a narrow angle of view, anticipating start of a large movement of the whole body of the target and capturing the large movement.

That is, by a relatively simple configuration, it is possible to photograph without failing such a scene that a lot of photographers want to photograph easily but fail in photographing. The problem that an object is not completely included within a screen is more remarkable as the zoom magnification is higher or as the angle of view is narrower. Here, failure in photographing is prevented by prediction of a movement. However, of course, the present invention is not limited thereto. The present invention is a technique which can be used for danger prediction or an alarm system by judgment of dash-out and can be applied to brakes mounted in vehicles.

Furthermore, it goes without saying that, if a dictionary is improved, the technique can be also used for insects, arthropods and, furthermore, living things other than vertebrate animals, such as microorganisms, by preparing a database in which characteristics of images of targets, sizes and movement patterns are recorded if they are known.

The one embodiment described above is configure so that, after a living thing other than a human being, an animal or the like is detected by the process sequence in FIG. 2, an optical angle-widening process of the lens section 15 is performed to acquire the second image data. In comparison, the optical angle-widening process of the lens section 15 may be executed to acquire the second image data when an operation mode prepared mainly for the purpose of photographing, for example, a bird, a cat or the like is set, and a process for cutout/generation of the first image data corresponding to an immediately previous zoom setting value or a zoom value which has been arbitrarily operation-instructed after setting of the operation mode.

The procedure for each process sequence described in each embodiment described above may be changed as far as the change does not depart from the nature of the process sequence. Therefore, it is possible to change the execution order of the respective process steps of the process sequences described above, execute multiple process steps at the same time, or change the order of the respective process steps each time the series of process sequences is executed, for example.

Note that the present invention is not limited to the embodiment described above, and it is, of course, possible to make various variations and applications within a range not departing from the spirit of the present invention. Furthermore, the above embodiment includes inventions at various stages, and various inventions can be extracted by appropriately combining the disclosed multiple components. For example, if, even after some components are deleted from all the components shown in the one embodiment described above, the problem to be solved by the invention can be solved and the advantageous effect of the present invention can be obtained, the configuration after the components have been deleted can be extracted as an invention. The present invention is limited only by accompanying claims and not restricted by any particular aspect.

The present invention is not limited to a photographing apparatus which is an electronic apparatus specialized in a photographing function, such as a digital camera, and is applicable to various electronic apparatuses provided with the photographing function in other forms, for example, a mobile phone, a recording apparatus, an electronic notebook, a personal computer, a game machine, a TV, a clock and a navigation apparatus using GPS (global positioning system) and the like.

A photographing method as described above can be often downloaded to an apparatus in a program form via a network, and it goes without saying that a mobile apparatus, such as a smartphone, with specifications obtained in such a form is included within the range covered by the present invention. In this case, a program developed on the assumption of an apparatus which downloads the program or an apparatus created on the assumption of downloading the program can be judged to use the present invention if the program or the apparatus is such that can display and record an image which a photographer has failed to take at the time of photographing but the apparatus has supplementarily photographed by changing the angle of view and timing.

Furthermore, according to the above embodiment of the present invention, inventions with the following configurations can be obtained. That is:

(1) A method for photographing a moving object, including:
  a step of generating image data by an image pickup section;
  a first part judgment step of judging a first part of an object in an image based on the image data;
  a second part judgment step of presuming and judging a second part of the object in the image based on the image data, from the first part;
  a change-in-part judgment step of judging change over time of the second part;
  a step of changing setting of a photographing condition in accordance with a result of the judgment of the change over time of the second part; and
  a step of recording the acquired image data.

(2) The method for photographing a moving object according to (1) above, wherein the step of changing the setting of the photographing condition is a step of changing and enlarging a range of photographing.

(3) A method for photographing a moving object, including:
  a step of generating image data by an image pickup section;
  a first part judgment step of judging a direction and size of a face part of an object in an image based on the image data; and
  a step of monitoring a particular part different from the face and changing a photographing condition in accordance with a result of judgment of change over time of the particular part.

(4) The method for photographing a moving object according to (3) above, further including a step of, on the basis of the direction of the face judged by the first part judgment step, judging a part of a body of the object which faces a direction different from the direction of the face.

(5) The method for photographing a moving object according to (3) above, further including a step of judging a part of a body of the object detected on the basis of the size of the face judged by the first part judgment step.

(6) A method for photographing a moving object, including:
  a step of detecting a size and direction of a face of a target from a result of judgment with a narrow angle of view;
  a step of judging that the target will make a large movement on the basis of a result of the detection step;
  a step of anticipating start of a large movement of a whole body of the target on the basis of a result of the judgment step; and
  a step of capturing the large movement of the target on the basis of each of the result of the judgment step and a result of the anticipation step.

What is claimed is:

1. A photographing apparatus comprising:
  an image pickup section picking up an image of an object at a particular angle of view; and
  control and signal processing circuits for (1) acquiring object image data based on the image of the object, (2) judging a main object in the image based on the object image data, (3) judging a position and direction of a face of the main object, (4) responsive to a determination that the face of the main object is sideways, estimating, by analysis of the object image data, a position of a second part of the main object from the judged position and direction of the face of the main object, and (5) responsive to a determination that the position of the second part of the main object cannot be estimated, judging a change of the second part, causing the image pickup section to pick up another image of the object at an angle of view wider than the particular angle of view, and acquiring object image data of the other image.

2. The photographing apparatus according to claim 1, wherein the second part is a lower back/hip or legs.

3. The photographing apparatus according to claim 1, wherein the control and signal processing circuits change photographing control in accordance with the judged change of the second part.

4. The photographing apparatus of claim 1 wherein the control and signal processing circuits cause the image pickup section to pick up another image of the object at an angle of view wider than the particular angle of view responsive to a prediction that the main object will make a sudden movement.

5. The photographing apparatus of claim 1 wherein the control and signal processing circuits cause the image pickup section to pick up another image of the object at an angle of view wider than the particular angle of view responsive to a prediction that the main object will make a sudden movement and at least a part of the main object will become outside of the predetermined angle of view due to the sudden movement.

6. A method for photographing a moving object, comprising the steps of:
  picking up an image of an object at a particular angle of view;
  acquiring object image data based on the image of the object;
  judging a main object in the image based on the object image data;
  judging a position and a direction of a face of the main object;
  responsive to a determination that the face of the main object is sideways, estimating, by analysis of the object image data, a position of a second part of the main object from the judged position and direction of the face of the main object; and
  responsive to a determination that the position of the second part of the main object cannot be estimated, judging a change of the second part, picking up another image of the object at an angle of view wider than the particular angle of view, and acquiring object image data of the other image.

7. The method of claim 6 wherein the picking up of another image of the object at an angle of view wider than the particular angle of view is responsive to a prediction that the main object will make a sudden movement.

8. The method of claim 6 wherein the picking up of another image of the object at an angle of view wider than the particular angle of view is responsive to a prediction that the main object will make a sudden movement and at least a part of the main object will become outside of the predetermined angle of view due to the sudden movement.

9. A non-transitory computer-readable storage medium storing a program for causing a computer to execute the method for photographing a moving object according to claim 6.

\* \* \* \* \*